(12) United States Patent
Schroeppel

(10) Patent No.: US 7,200,225 B1
(45) Date of Patent: Apr. 3, 2007

(54) ELLIPTIC CURVE POINT AMBIGUITY RESOLUTION APPARATUS AND METHOD

(76) Inventor: Richard Schroeppel, 500 S. Maple Dr., Woodland Hills, UT (US) 84653

( * ) Notice: Subject to any disclaimer, the term of this patent is extended or adjusted under 35 U.S.C. 154(b) by 610 days.

(21) Appl. No.: 09/710,987

(22) Filed: Nov. 8, 2000

Related U.S. Application Data (63) Continuation-in-part of application No. 09/518,389, filed on Mar. 3, 2000, now Pat. No. 6,490,352.

(60) Provisional application No. 60/196,696, filed on Apr. 13, 2000, provisional application No. 60/165,202, filed on Nov. 12, 1999.

(51) Int. Cl.
*H04K 1/00* (2006.01)
*H04L 9/00* (2006.01)

(52) U.S. Cl. .............. 380/28; 380/30; 380/44; 380/277; 380/278

(58) Field of Classification Search .......... 380/30, 380/9, 28, 44, 277, 278
See application file for complete search history.

(56) References Cited

U.S. PATENT DOCUMENTS

| | | | |
|---|---|---|---|
| 5,442,707 A | 8/1995 | Miyaji et al. .............. 380/30 |
| 5,805,703 A | 9/1998 | Crandall .................... 380/30 |
| 5,812,438 A | 9/1998 | Lan et al. |
| 5,854,759 A * | 12/1998 | Kaliski et al. .............. 708/492 |
| 5,892,912 A | 4/1999 | Suzuki et al. |
| 5,982,895 A | 11/1999 | Dworkin et al. ............ 380/9 |
| 6,038,581 A | 3/2000 | Aoki et al. ................. 708/492 |
| 6,141,420 A * | 10/2000 | Vanstone et al. ........... 380/30 |
| 6,163,841 A | 12/2000 | Venkatesan et al. ....... 713/176 |
| 6,212,277 B1 * | 4/2001 | Miyaji ........................ 380/30 |
| 6,252,959 B1 | 6/2001 | Paar et al. .................. 380/28 |
| 6,263,081 B1 * | 7/2001 | Miyaji et al. ............... 380/28 |

(Continued)

FOREIGN PATENT DOCUMENTS

EP 98302286 10/1998

(Continued)

OTHER PUBLICATIONS

Noam D. Elkies, "Explicit modular towers" Harvard University, 1998.*

(Continued)

*Primary Examiner*—Kim Vu
*Assistant Examiner*—Beemnet W Dada (57) ABSTRACT

An apparatus for operating a cryptographic engine may include a key generation module for creating key pairs for encrypting substantive content to be shared between two users over a secured or unsecured communication link. The key generation module may include a point-modification module as part of an elliptic curve module for creating and processing keys. The point-modification module preferably employs a point-halving algorithm for creating and processing keys but may also employ any one or a combination of a variety of other algorithms. Hash functions may be used to further process ephemeral secrets or ephemeral keys that may be used for transactions, sessions, or other comparatively short time increments of communication. The keys generated by the key generation module may be configured to be processable by an encryption system for divulging independently to two independent parties a secret to be shared by the two independent parties. A point-halving algorithm may be provided to reduce the operation count of a cryptographic process.

59 Claims, 6 Drawing Sheets

U.S. PATENT DOCUMENTS 6,337,909 B1 * 1/2002 Vanstone et al. ............. 380/28
6,480,606 B1 * 11/2002 Kurumatani ................. 380/30

FOREIGN PATENT DOCUMENTS

WO  WO 96/04602  2/1996
WO  WO 01/04742  1/2001

OTHER PUBLICATIONS

Erik Woodward Knudsen, "Elliptic Scalar Multiplication Using Point Halving", Nov. 1999.*

Lopez et al., "on computing a multiple of an elliptic curve point", 1998.*

Kaliski jr. et al. "Efficient finite field basis conversion involving dual bases" 1999.*

Koyama et al. Elliptic Curve Cryptosystems and Their Applications, IEICE Transactions on Information and Systems, Jan. 1992.*

Elkies Noam D. Explicit modular towers, Dept. of Mathematics, Harvard University, 1998.*

Schroeppel, R. et al. "Fast Key Exchange with Elliptic Curve Systems," Advances in Cryptology- CRYPTO'95, Aug. 31, 1995, pp. 43-56.

Vanstone, S.A. et al., "Elliptic Curve Cryptosystems Using Curves of Smooth Order Over the Ring Zn," IEEE Trans. On Information Theory, vol. 43, No. 4, Jul. 1994, pp. 1231-1237.

Knudson, E., "Elliptic Scalar Multiplication Using Point Halving," Asiacrypt '99, Nov. 14, 1999, pp. 134-149.

"Efficient Algorithms for Elliptic Curve Cryptosystems," 1997 Jorge Guarjardo excerpt, Advances in Cryptology—Crypto 1997, © 1998 Springer-Verlag, pp. 242-356.

"New Public-Key Schemes Based on Elliptic Curves over the Ring $Z_n$," 1991Kenji Koyama excerpt, Advances in Cryptology—Crypto 1991, © 1998 Springer-Verlag, pp. 252-266.

"Integer Division in Residue Number Systems," 1994 Hitz, M.A. and Kaltofen, E., excerpt IEEE Transactions on Computers, © 1995 IEEE, pp. 983-989.

* cited by examiner

ELLIPTIC CURVE POINT AMBIGUITY RESOLUTION APPARATUS AND METHOD

RELATED APPLICATIONS

This application claims the benefit of U.S. Provisional Application Ser. No. 60/165,202, filed Nov. 12, 1999 and entitled METHOD AND APPARATUS FOR ELLIPTIC CURVE POINT AMBIGUITY RESOLUTION, is a continuation-in-part of patent application Ser. No. 09/518,389, filed Mar. 3, 2000 now U.S. Pat. No. 6,490,352 and entitled CRYPTOGRAPHIC ELLIPTIC CURVE APPARATUS AND METHOD, and claims the benefit of U.S. Provisional Application Ser. No. 60/196,696, filed Apr. 13, 2000 and entitled AUTOMATICALLY SOLVING EQUATIONS IN FINITE FIELDS. The foregoing applications are hereby incorporated herein by reference.

BACKGROUND

1. The Field of the Invention

This invention relates to cryptography and, more particularly, to novel systems and methods for increasing the speed of cryptographic key computations by computers.

2. The Background Art

The science of cryptography has existed since ancient times. In recent years, cryptography has been used in special purpose software programs for a variety of purposes, such as hiding underlying contents, limiting access, inhibiting reverse engineering, authenticating sources, limiting unauthorized use, and the like.

Cryptographic Processes

Modern cryptography protects data transmitted over a network or stored in computer systems. Two principal objectives of cryptography include (1) secrecy, e.g., to prevent the unauthorized disclosure of data, and (2) integrity (or authenticity), e.g., to prevent the unauthorized modification of data. Encryption is the process of disguising plaintext data in such a way as to hide its contents, and the encrypted result is known as ciphertext. The process of turning ciphertext back into plaintext is called decryption.

A cryptographic algorithm, also known as a cipher, is a computational function used to perform encryption and/or decryption. Both encryption and decryption are controlled by one or more cryptographic keys. In modern cryptography, all of the security of cryptographic algorithms is based on the key(s) and does not require keeping the details of the cryptographic algorithms secret.

There are two general types of key-based cryptographic algorithms: symmetric and public-key. In symmetric algorithms, the encryption key can be calculated from the decryption key and vice versa. Typically, these keys are the same. As such, a sender and a receiver agree on the keys (a shared secret) before they can protect their communications using encryption. The security of the algorithms rests in the key, and divulging the key allows anyone to encrypt and decrypt data or messages with it.

In public-key algorithms (also called asymmetric algorithms), the keys used for encryption and decryption differ in such a way that at least one key is computationally infeasible to determine from the other. To ensure secrecy of data or communications, only the decryption key need be kept private, and the encryption key can thus be made public without danger of encrypted data being decipherable by anyone other than the holder of the private decryption key.

Conversely, to ensure integrity of data or communications, only the encryption key need be kept private, and a holder of a publicly-exposed decryption key can be assured that any ciphertext that decrypts into meaningful plaintext using this key could only have been encrypted by the holder of the corresponding private key, thus precluding any tampering or corruption of the ciphertext after its encryption.

A private key and a public key may be thought of as functionally reciprocal. Thus, whatever a possessor of one key of a key pair can do, a possessor of the other key of the key pair can undo. Accordingly, secret information may be communicated without an exchange of keys.

An asymmetric algorithm assumes that public keys are well publicized in an integrity-secure manner. A sender can then know that the public key of the receiver is valid and not tampered with. One way to ensure integrity of data packets is to run data through a cryptographic algorithm. A cryptographic hash algorithm may encrypt and compress selected data. Various cryptographic hash algorithms are known, such as the Secure Hash Algorithm (SHA) and Message Digest 5 (MD5).

A certificate is a data structure associated with assurance of integrity and/or privacy of encrypted data. A certificate binds the identity of a holder to a public key of that holder, and may be signed by a certification authority (CA). In a public key infrastructure (PKI), a hierarchy of certification authorities may be provided, each level vouching for the authenticity of the public keys of subordinate levels.

A certificate may contain data regarding the identity of the entity being certified, the key held (typically a public key), the identity (typically self-authenticating) of the certifying authority issuing the certificate to the holder, and a digital signature protecting the integrity of the certificate itself. A digital signature may typically be based on the private key of the certifying authority issuing the certificate to the holder. Thus, any entity to whom the certificate is asserted may verify the signature corresponding to the private key of the certifying authority.

In general, a signature of a certifying authority is a digital signature. The digital signature associated with a certificate enables a holder of the certificate, and one to whom the certificate is asserted as authority of the holder, to use the signature of the certifying authority to verify that nothing in the certificate has been modified. This verification is accomplished using the certificate authority's public key, thus providing a means for verifying the integrity and authenticity of the certificate and of the public key in the certificate.

Various cryptographic techniques rely on elliptic curves. Code and documentation for the use of elliptic curves in cryptography are available. For example, standard references, including certain algebra texts discussing Galois Fields, sometimes called "finite fields," are available in the art.

One reason for interest in acceleration of elliptic curve processing is the increasing size of cryptographic keys. Mathematical calculations often increase geometrically with the size of the keys. Accordingly, if the speed of elliptic curve processing can be increased, less processing time is required for more secure, longer cryptographic keys. Thus, what is needed is methods and apparatus for accelerating computations associated with creating, weaving, and processing of cryptographic keys.

Public key cryptography makes extensive use of modular arithmetic functions and concepts, especially powers. Computing $A^B \pmod{C}$ is a staple operation. Hereinafter, the caret ^ means exponentiation (i.e., A to the power B). Generally, the modular arithmetic can be replaced with operations in an arbitrary group, and elliptic curve groups have been found to be useful. Instead of (mod C), an elliptic curve group G can be used. The elements of G are called points. The multiplication operation (mod C) is replaced by addition of group elements (points), and the exponentiation A^B is replaced by adding B copies of the point A.

BRIEF SUMMARY AND OBJECTS OF THE INVENTION

In view of the foregoing, it is a primary object of the present invention to provide an apparatus and method comprising an elliptic curve, point modification system.

Consistent with the foregoing object, and in accordance with the invention as embodied and broadly described herein, an apparatus and method are disclosed in certain embodiments of the present invention as including a method and apparatus for operating a cryptographic engine supporting a key generation module. The key generation module creates key pairs for encryption of substantive content to be shared between two users over a secured or unsecured communication link.

In certain embodiments an apparatus and method in accordance with the present invention may include an apparatus and method useful for communications, for example over an insecure channel such as a public network. It is an object of the invention to provide an apparatus and method that may be used for Key Exchange, and for Signing and Verifying messages. It is a further object of the invention to provide an apparatus and method that is useful in electronic commerce, specifically without limitation for distributing authenticated public keys over the Internet and for encryption generally.

It is another object of the present invention to provide an apparatus and method for efficient and rapid authentication of physical documents, such as airplane tickets, postage stamps, bonds, and the like. The present invention may also be used as part of an electronic cash system.

Most public key cryptography operations such as key exchange, digital signatures, encryption, and entity authentication, can be implemented very efficiently using elliptic curve arithmetic. It is an object of this invention to make elliptic curve arithmetic faster, and thereby improve the public key operations. It is yet another object of the invention to be useful for faster elliptic-curve key exchange, for faster elliptic-curve ElGamal encryption, for faster elliptic-curve Digital Signatures, and for faster MQV authentication (see IEEE draft standard P1363). It is also an object of the invention to be generally useful wherever computations with elliptic curves are used. The improvement works with any field-element representation, including polynomial basis representation, normal basis representation, and field-tower representation.

The invention is described as a set of formulas which are implemented as a computer program. The same computations can also be carried out very efficiently in purpose-built hardware devices, or in semi-custom logic, for example, smart-cards or FPGA circuits, or as firmware controlling hardware, or as combinations of these elements.

A principal feature provided by an apparatus and method in accordance with the invention includes a point modification algorithm that manipulates points of an elliptic curve method. The point modification algorithm may be used in generating a key using a selected elliptic curve method, which may be used to encrypt substantive content using the key. The point modification algorithm may be employed using any one or a combination of point addition, point subtraction, point fractioning, point multiplying, rotating, and negative point modification.

In one aspect of the invention, the point fractioning may be selected from integral point fractioning, corresponding to a denominator that is an integral number, and point multiplying may be selected from integral multiplication, imaginary multiplication, and complex multiplication. In selected embodiments, the point modification algorithm may be dynamically selected during use in lieu of specifying the modification operation in advance.

In another aspect of the invention, a selected property may be used to select a point on which to execute the point modification algorithm. The selection property may include without limitation membership of the point in a selected subgroup. The selection property may include reliance on a bit mask of coordinates corresponding to points in a subgroup.

A point may be selected and pre-modified by a modification operation that compensates for some of the processing steps. A point may be selected by testing whether a halving procedure can be executed on the point an arbitrary number of times selected by a user. The modification process may also include determining which of a selected number of points is to be used. The foregoing point modification processes may be repeated with a second point, which is selected by either a deterministic process or a random process.

In yet another aspect of the invention, substantive content may be sent by a sender and received by a receiver. The sender may use a modification process for encryption that is separate and distinct from the modification that the receiver uses for decryption. The key may be a symmetric key configured to be shared by two or more parties, a decryption code for processing an encrypted signal, a digital signature, an asymmetric key, or an authentication. The modification operation may also include the step of selecting a point from either a hyperelliptic, an algebraic curve, or an abelian variety.

In a further aspect of the invention, the modification process may be the halving of a point. The point to be halved may be represented in a cartesian space or the point may exist in a mapped cartesian space having a cartesian representation. The halving operation may include only a single multiplication per halving operation or multiple multiplications. The selected point may be by a cartesian tuple and halving may be accomplished using no more than two field multiplications. The halving operation may be negative halving including without limitation computation of a minus one-half multiple. The modification process may also include computing a fractional multiple of a point represented as a proper fraction, an improper fraction, or a complex fractional multiple.

Another feature provided by an apparatus and method in accordance with the invention includes a point modification algorithm as part of an elliptic curve module within a key generation module for creating and processing keys. Hash functions may be used to further process ephemeral secrets or ephemeral keys that may be used for transactions, sessions, or other comparatively short time increments of communication. The modification algorithm preferably employs one or some combination of point addition, point subtraction, point fractioning, point multiplying, rotating, and negative point modification.

The keys generated by the key generation module may be configured to be processable by an encryption system for divulging independently to two independent parties a secret to be shared by the two independent parties. In various embodiments, a point modification algorithm is provided to reduce the operation count of a cryptographic process.

The present invention may also be embodied as an article storing an encryption engine for operating on keys configured to encrypt substantive content representing information that includes a key generation module for operating on the keys and a point modification algorithm for calculating points related to the key. The point modification algorithm may employ one or more of point addition, point subtraction, point fractioning, point multiplying, rotating, and negative point modification.

In one aspect of the invention, the point halving module may include a register for storing an ordered pair of variables selected to be operated on for executing point halving. The ordered pairs may represent a set of coordinates corresponding to a point on an elliptic curve.

The above objects may be met by one or more embodiments of an apparatus and method in accordance with the invention. Likewise, one or more embodiments of an apparatus and method in accordance with the invention may provide the desirable features as described.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 6, is not intended to limit the scope of the invention, as claimed, but it is merely representative of certain presently preferred embodiments of the invention.

The presently preferred embodiments of the invention will be best understood by reference to the drawings, wherein like parts are designated by like numerals throughout. Reference numerals having trailing letters may be used to represent specific individual items (e.g. instantiations) of a generic item associated with the reference numeral. Thus, a number 156a, for example, may be the same generic item as number 156f, but may result from a different version, instantiation, or the like. Any or all such items may be referred to by the reference numeral 156.

Figure 1:
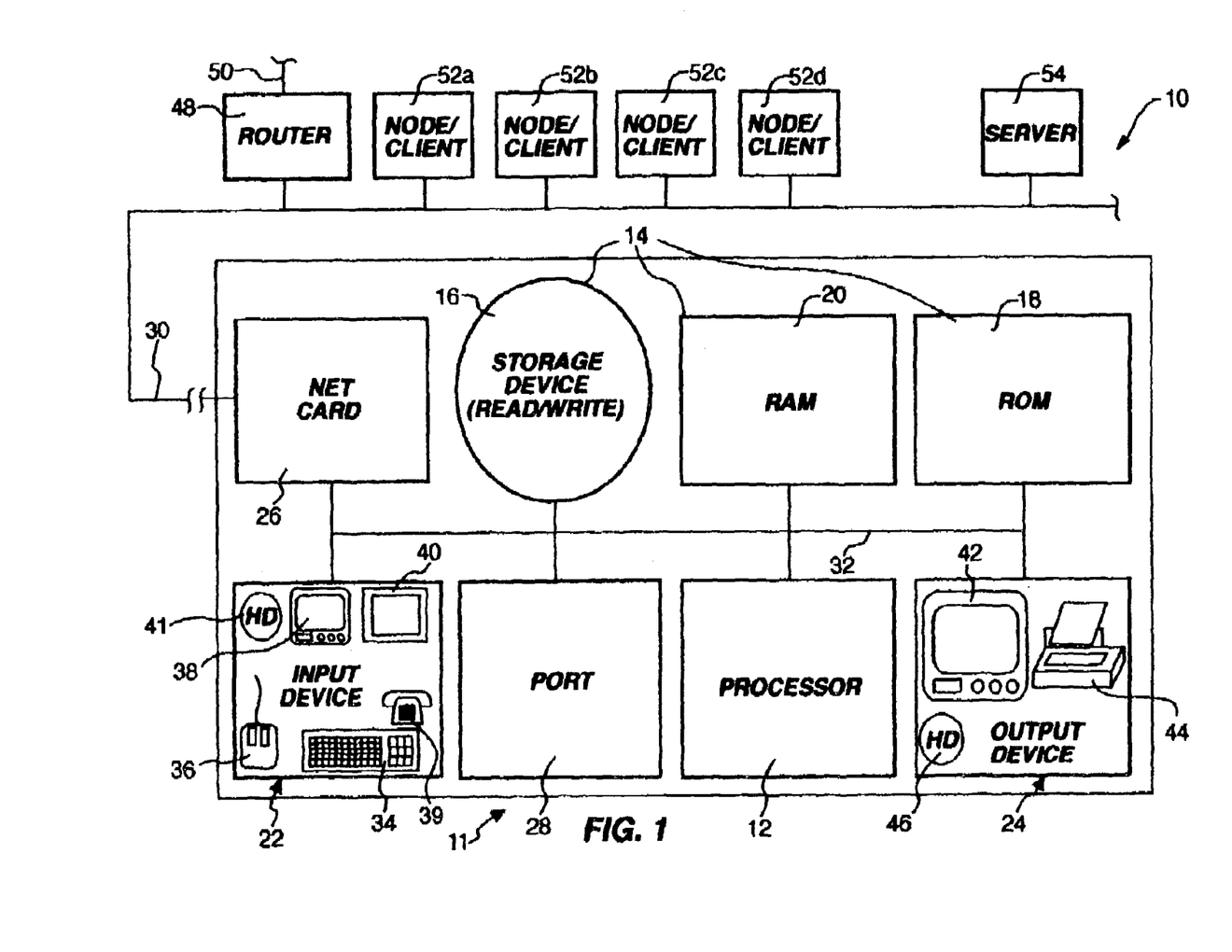
FIG. 1 is a schematic block diagram of an apparatus suitable for implementing a method and system in accordance with the invention for an individual user, or multiple users communicating over a network or internetwork.

Referring to FIG. 1, an apparatus 10 may implement the invention on one or more nodes 11, (client 1, computer 11) containing a processor 12 or CPU 12. All components may exist in a single node 11 or may exist in multiple nodes 11, 52 remote from one another. The CPU 12 may be operably connected to a memory device 14. A memory device 14 may include one or more devices such as a hard drive or non-volatile storage device 16, a read-only memory 18 (ROM) and a random access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36 or similar pointing device. A touch screen 38, a telephone 39, or simply a telephone line 39, may be used for communication with other devices, users, or the like. Similarly, a scanner 40 may be used to receive graphical inputs which may or may not be translated to other character formats. A memory device 41 of any type (e.g. hard drive, floppy, etc.) may be used as an input device, whether resident within the node 11 or some other node 52 on the network 30, or from another network 50.

Output devices 24 may likewise include one or more physical hardware units. For example, in general, the port 28 may be used to accept inputs and send outputs from the node 11. A monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 11, 52, 54) may have various communication capabilities.

In certain embodiments, a minimum of logical capability may be available in any node 52. Note that any of the individual nodes 11, 52, 54 may be referred to, as may all together, as a node 11 or a node 52. Each may contain a processor 12 with more or less of the other components 14–44.

A network 30 may include one or more servers 54. Servers may be used to manage, store, communicate, transfer, access, update, and the like, any practical number of files, databases, or the like, for other nodes 52 on a network 30. Typically, a server 54 may be accessed by all nodes 11, 52 on a network 30. Nevertheless, other special functions, including communications, applications, directory services, and the like may be implemented by an individual server 54 or multiple servers 54. A node 11 may be a server 54.

In general, a node 11 may need to communicate over a network 30 with a server 54, a router 48, or nodes 52 or server 54. Similarly, a node 11 may need to communicate over another network (50) in an internetwork connection with some remote node 52. Likewise, individual components 12–46 may need to communicate data with one another. A communication link may exist, in general, between any pair of devices. The process and method of the invention may be performed on the hardware structure illustrated in FIG. 1.

Figure 2:
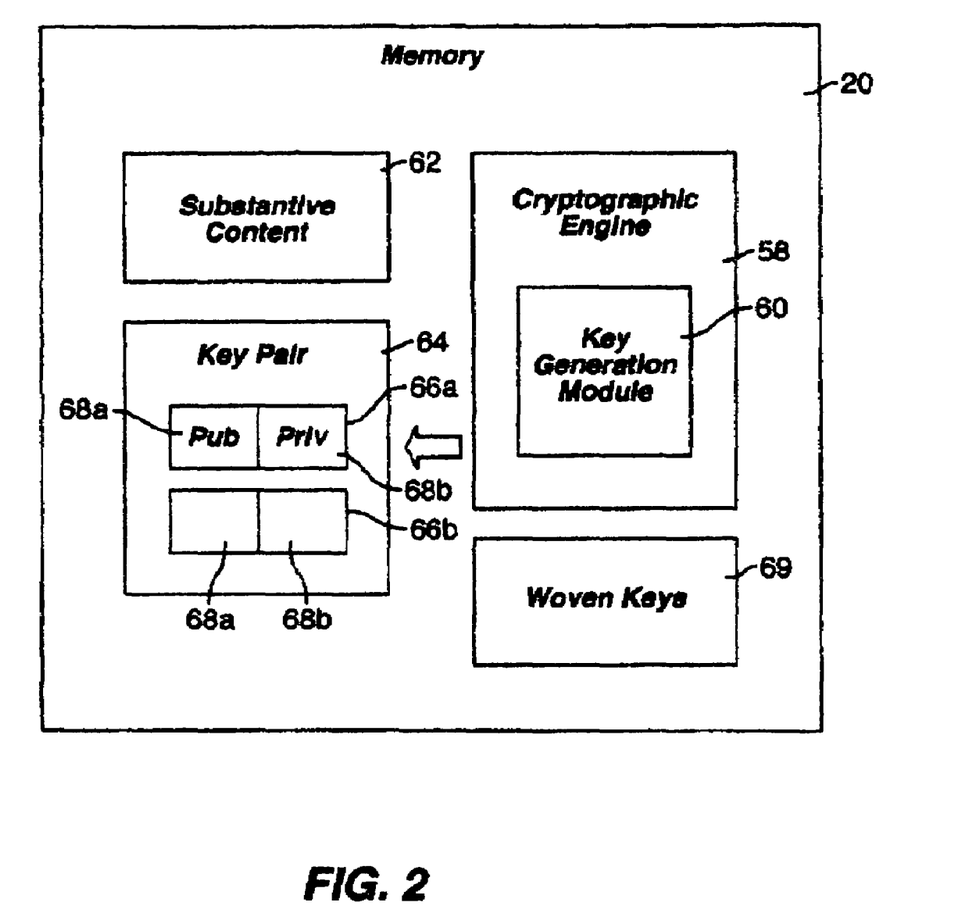
FIG. 2 is a schematic block diagram of select modules that may be hosted in a memory device operating on a computer of a user in accordance with the invention.

Referring to FIG. 2, a memory device 20 in an apparatus 10, and more particularly in an individual computer 11, may include a cryptographic engine 58 for creating, manipulating, processing, using, and otherwise operating on cryptographic keys. Cryptographic keys are known in the art. A key generation module 60 may be responsible for creating keys that may be used to encrypt substantive content 62 for one of a multitude of purposes. As discussed above, the substantive content 62 may be used for various functionalities, including transmission of the substantive content 62 between users.

In general, a key generation module 60 may support local and remote repositories 64 of key pairs 66. A key pair 66 may involve a public key 68a and a private key 68b. In alternative embodiments, a particular key pair 66a may include symmetric keys 68a, 68b. However, in current strong cryptography, the individual keys 68a, 68b are a public/private pair used as described above for preparing and processing information to be sent and received.

In certain embodiments, keys 68a, 68b from various users may be mixed and matched between public and private keys in order to prepare woven keys 69 that are used by senders and receivers on opposite ends of a communication link to securely hide, authenticate, sign, etc., substantive content 62 that is being exchanged.

Figure 3:
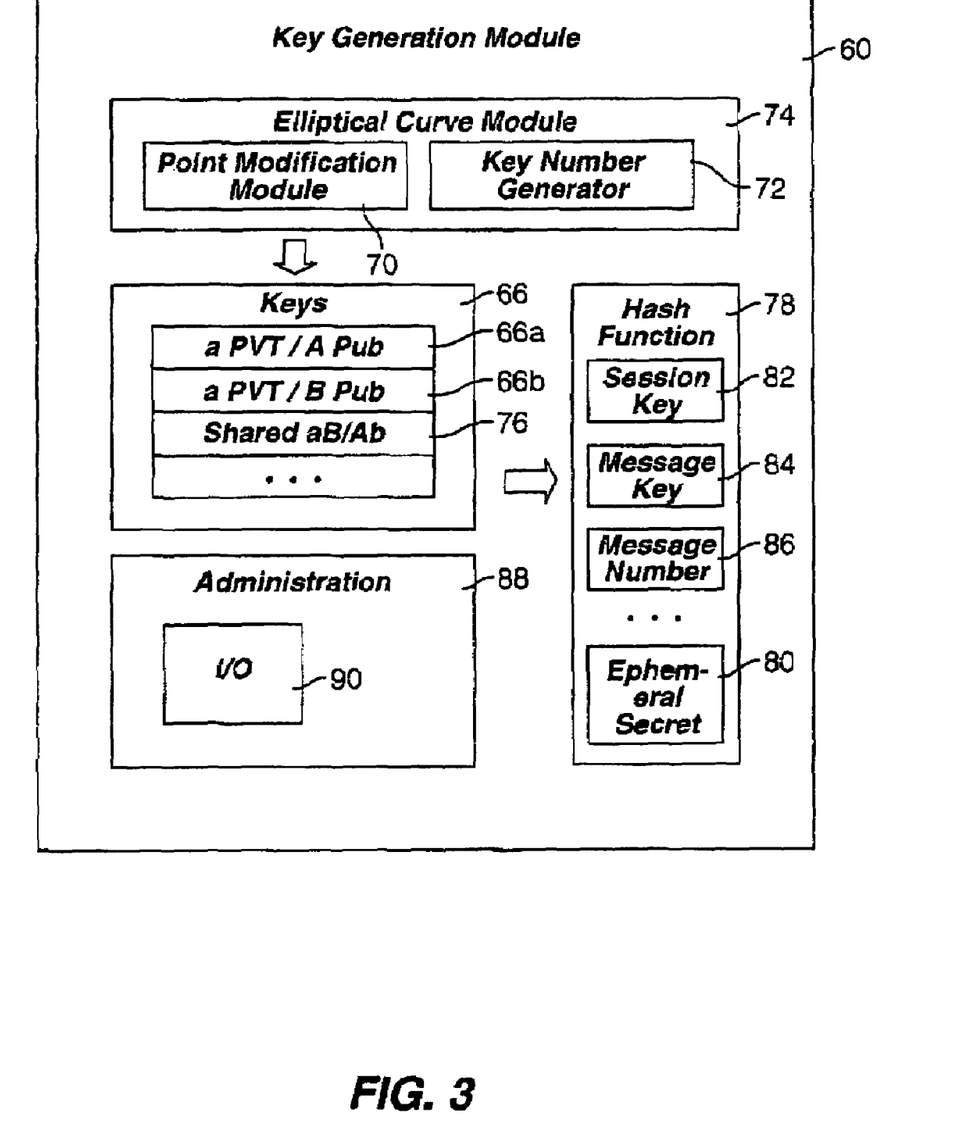
FIG. 3 is a schematic block diagram of a key generation module that may implement certain aspects of a method and system in accordance with the invention.

Referring to FIG. 3, the key generation module 60 may include an elliptic curve module 74 in accordance with the invention. In one presently preferred embodiment, a point modification module 70 may operate in accordance with the algorithms described hereinafter, to generate the keys 68 provided by the key generation module 60. The point modification module 70 may employ one or more of point addition, point subtraction, point fractioning, point multiplying, rotating, negative point modification, alone or in combination, for modifying points. A key number generator 72 may include an executable of basic simplicity or considerable sophistication in order to create keys having a desired level of security. Levels of security are typically defined in terms of the algorithms executed by key number generators 72, and equivalent processing 72 executed upon receipt of encrypted information.

Key pairs 66, such as the public/private pairs 66a, 66b or the shared, woven keys 76, may be processed by a hash function 78. The hash function 78 may typically operate on an ephemeral secret 80. An ephemeral secret 80 may be embodied in a session key 82 shared by two users over a communication link during a "session" period of time defined by the users or by their respective computers. Similarly, for a single communication of substantive content 62, an individual message key 84 may be created and relied upon. In one embodiment, a message key 84 may be embodied simply as a message number 86 corresponding to a time, random number, or some combination of numbers associated by a user with a single message.

Practicalities of computation associated with cryptography require that some number of administration modules 88 provide support for the key generation module 60. For example, in one embodiment, input/output drivers 90 may be provided. Likewise, the input/output systems 90 may provide the wrapping, pre-processing, post-processing, maintenance, verification, and the like associated with creating, distributing, using, and management of the keys 68.

Figure 4:
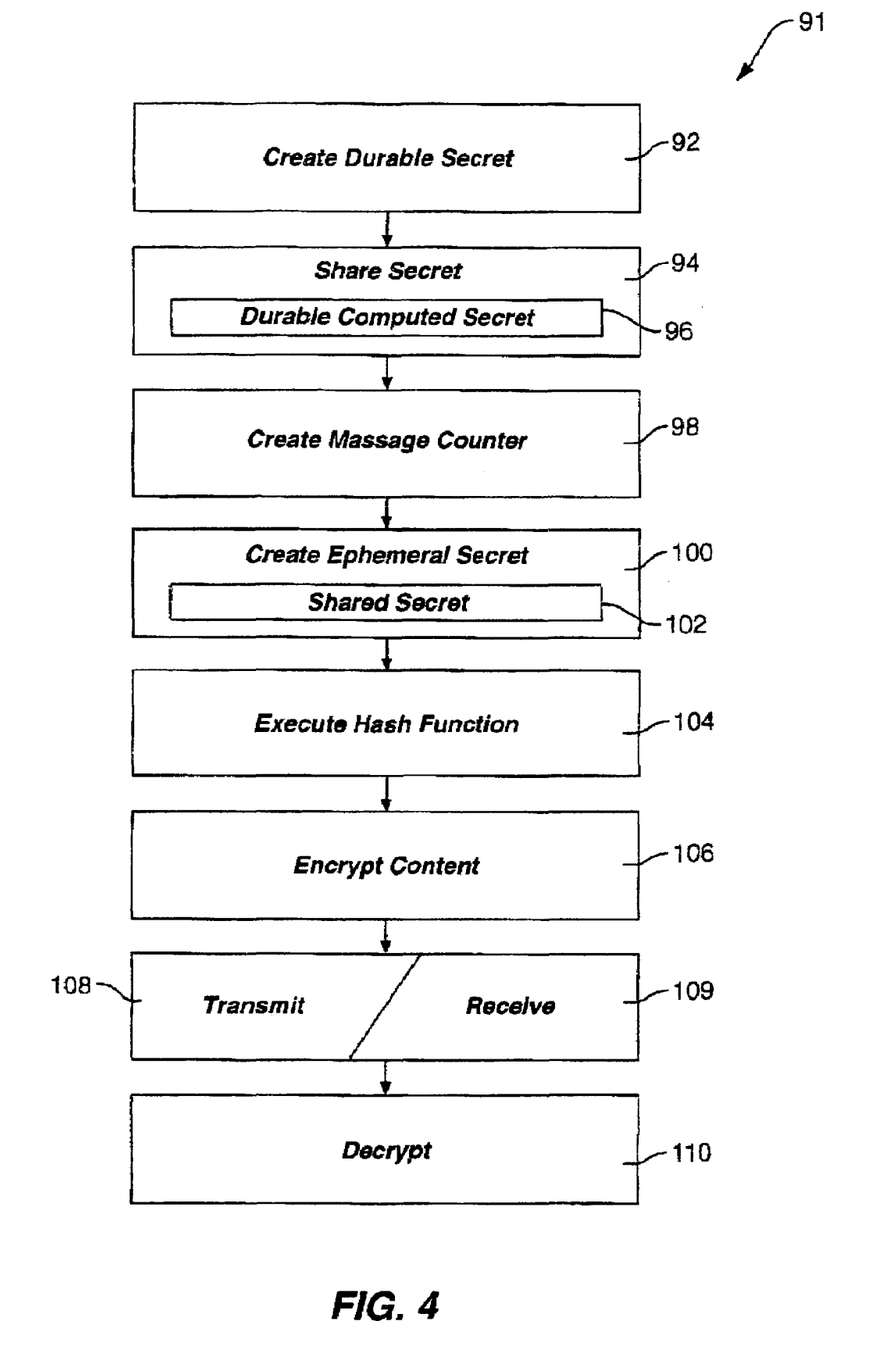
FIG. 4 is a schematic block diagram of a process for encryption using a method in accordance with the invention.

Referring to FIG. 4, a method 91 for using the apparatus and systems in accordance with the invention may involve creating 92 a durable secret. A durable secret may refer to a shared key (whether symmetric or asymmetric) that will be relied upon over an extensive period of time, such as a year.

Sharing 94 the durable secret involves an exchange, distribution, or the like of a durable secret 96 or computed secret 96 sufficiently strong to be reliable over an extensive period of time involving numerous communications between users. In order to initiate use, creating 98 a message counter may occur during individual transactions, in preparation for a short sequence of transactions, or for some other time period that is comparatively short, spanning a transaction, a few transactions, or the like.

In general, creating the message counter 98 will be used for creating 100 an ephemeral secret 80. For example, the shared secret 102 may have a duration of a single message, or a single computer session, or the like. Thus, the shared secret 102 may be an ephemeral secret 80 of a comparatively short length or suitable for processing by a comparatively simple process. However, creating 100 an ephemeral secret 80, such as the shared secret 102 may be computationally very intensive due to both the manipulations of numbers required as well as the frequency with which such creating 100 is done.

Executing 104 a hash function may be done as known in the art or as described in the art. Hashing 104 provides verification to both machines and users that no message modification, whether intentional or unintentional (e.g., modification simply due to a computer glitch, has occurred. Hashing is also used to operate on the woven key 69 and the message number 86 to create an ephemeral symmetric key.

Thereafter, encrypting 106 substantive content 62 may be followed by a transmission 108 and corresponding receipt 109 of the substantive content 62. The substantive content 62 may have been prepared with a cryptographic system. Note that the substantive content 62 may merely be a signature on a document in the clear. Alternatively, substantive content 62 may have been encrypted itself and wrapped, as well as being signed, authenticated, verified, and the like.

Thus, cryptographic key generation modules 60, or more properly, key management modules 60, may manage one or more keys. Moreover, those one or more keys may be incoming, outgoing, or the like. Also, those keys 68 may be used on substantive content 62, that is destined to be outgoing, incoming, or both.

Decrypting 110 returns substantive content 62 into the clear. Decrypting 110 may be more complex, exactly the same complexity, or less complex than an encrypting process 106. Nevertheless, in certain embodiments, encrypting 106 and decrypting 110 are substantially mirror images of one another.

Figure 5:
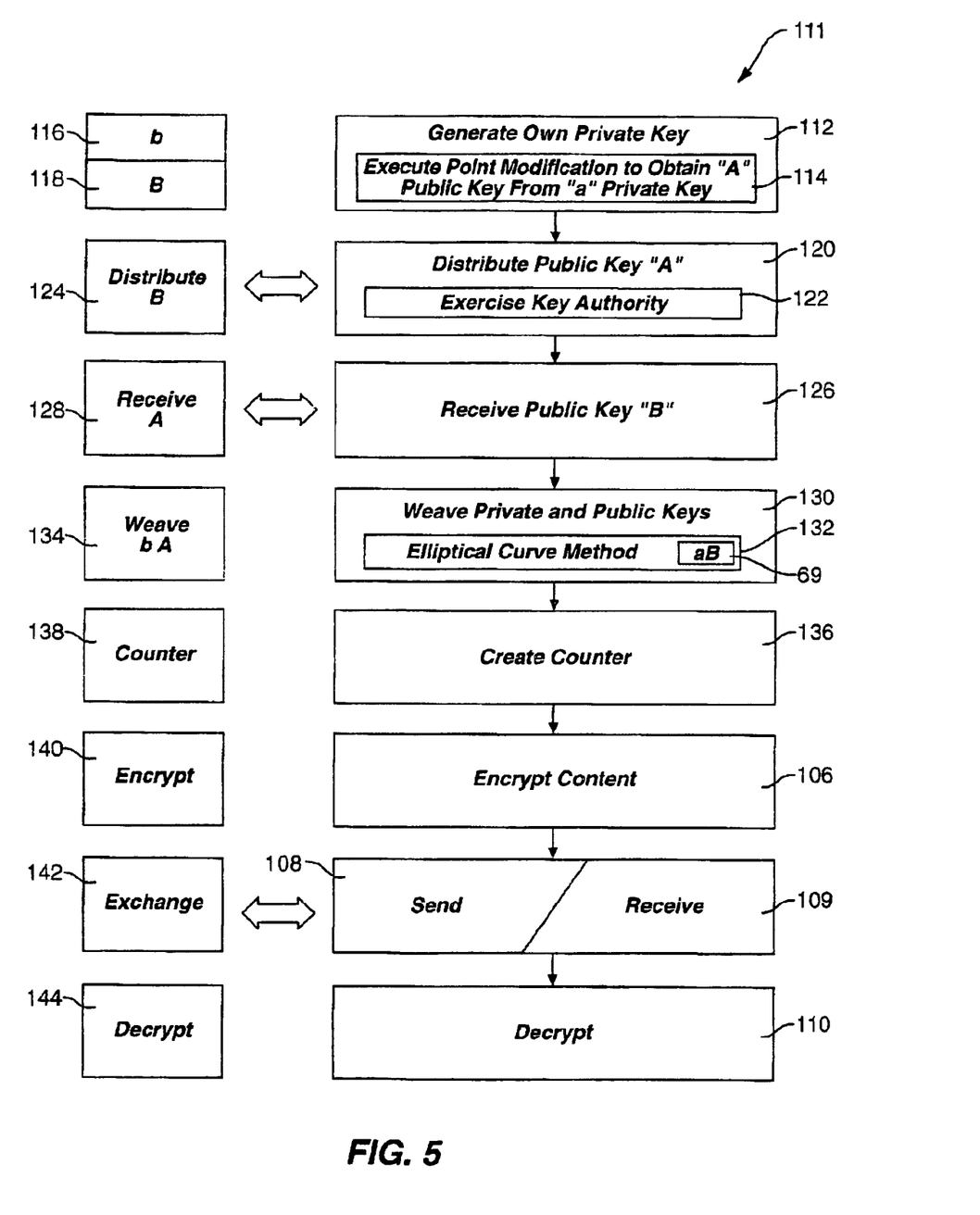
FIG. 5 is a schematic block diagram of a process in accordance with the invention including generation of keys, use of the keys for encryption, and decryption of the content of a message.

Referring to FIG. 5, a method 111 in accordance with the invention may include generating 112 a private key 68b. Generating 112 keys may rely on executing 114 a point modification method, which may include without limitation a point halving method, in order to obtain an initial public key based on a corresponding private key. At another location, a different user who will eventually correspond to an initial user, may also generate 116 a public key from a private key relying on point modification 118, which may be a point halving 118. At this stage, the generation processes 112, 116 are performed apart.

Distributing 120 a public key 68a may require authorization or other exercise 122 of a key authority. In other words, one may execute 122 or exercise 122 a key authority, where the key authority is an actual entity or where the authority represents the authorization owned by an entity. Accordingly, in a corresponding process, a distribution 124 of a key that will end up being distributed to a first user from a second user may be completed.

Thus, a user "A" may distribute a public key "A" to a user "B." Similarly, a user "B" may distribute a public key "B" to a remote user "A." A user may receive 126 a public key from another user. Accordingly, a corresponding partner in communication may receive 28a a first user's public key.

In certain embodiments, weaving 130 one's own private key with a received public key may rely on an elliptic curve method 132. The elliptic curve method 132 results in a woven key 69. Similarly, weaving 134 results in the same woven key for a remote user. Creating 136, 138 a counter enables an encryption 106, 140 of substantive content 62 being shared between a user "A" and a user "B."

Exactly who performs the encrypting 106, 140 depends upon the directionality of a message, authentication, or other substantive content 62. Appropriately, a transmission 108 and reception 109, or a send 108 and a receive 109 will represent a particular user. Similarly an exchange 142 (which may be a send 108 or a receive 109) represents activities at a remote user.

Accordingly, decrypting 110, 144 provides the substantive content 62 in the clear. Of course, the substantive content 62 may simply be knowledge provided by transmission of signatures, authentications, and the like. Each of the processes of generating 112 distributing 120, weaving 130, and the like may involve the processing of large numerical keys. The use of a method and apparatus in accordance with the invention may be more time-consuming or time-saving depending on the frequency and complexity of any particular key manipulation. Similarly, encrypting 106, 140 and decrypting 110, 144 may use methods in accordance with the invention, depending on the need for security, the complexity, the frequency, and so forth.

Figure 6:
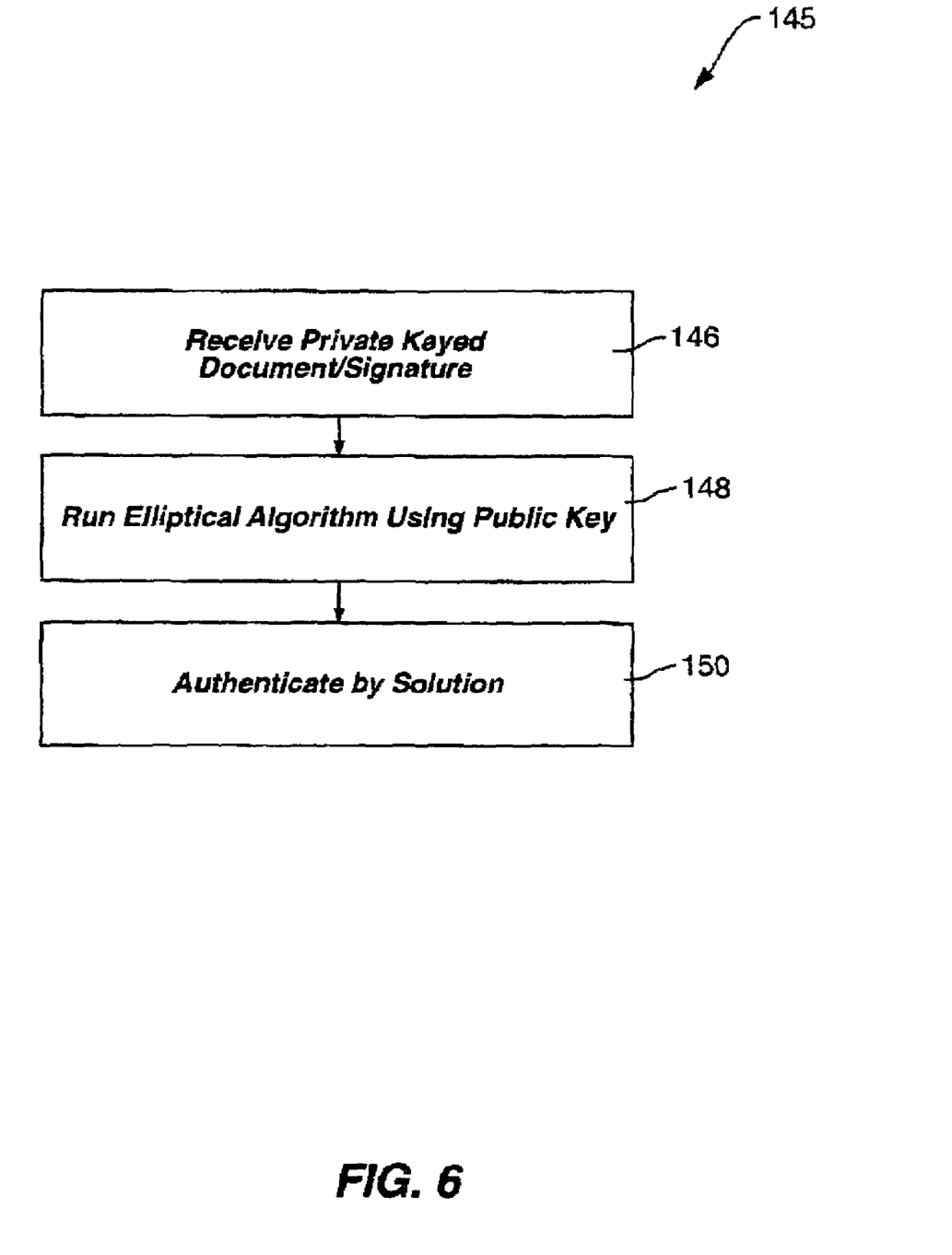
FIG. 6 is a schematic block diagram of an abbreviated method of authentication in accordance with the invention.

Referring to FIG. 6, an embodiment of a method 145 may be simplified to receiving 146 a privately keyed document. A document may actually be a signature. Nevertheless, receiving 146 implies keyed (encrypted) processing.

Next, running 148 an elliptic algorithm using public key processed information prepared with a private key by an originator. Authenticating 150 may represent a successful calculation of a solution to an equation or set of equations using the keys 68 or a key 68.

Most public key cryptography operations such as key exchange, digital signatures, encryption, and entity authentication, can be implemented very efficiently using elliptic curve arithmetic. An apparatus and method in accordance with the invention may make elliptic curve arithmetic faster, and thereby improve the public key operations. Faster elliptic-curve key exchange, faster elliptic-curve ElGamal encryption, for faster elliptic-curve Digital Signatures, and for faster MQV authentication (see IEEE draft standard P1363), are most useful, although the methods herein may be helpful wherever computations with elliptic curves are used.

Such a method works with any field-element representation, so long as a reasonably efficient reciprocal operation is available. This includes polynomial basis representation, normal basis representation, and field-tower representation. A set of formulas in accordance with the invention may be implemented in a computer program, such as the point modification module 70. In certain presently preferred embodiments, the point modification module 70 is configured to generate a key using a point modification algorithm, as described immediately below. The same computations can also be carried out very efficiently in firmware, dedicated hardware devices, or in semi-custom logic, such as, for example, smart-cards or FPGA circuits.

In finite fields $GF[2^K]$, addition may be performed by way of an XOR operation. Use of the XOR operation makes performance of addition and subtraction substantially equivalent operations. Use of the XOR operation also makes squaring and square-rooting operations comparatively computationally economical. In contrast to real-number operations, squaring and square-rooting are 1-1 operations in a $GF[2^K]$ field, as a result of every field element having exactly one square-root. The symbol "sqrt" hereinafter represents the square-root operation. Squaring and square-root are LINEAR operators, which may be represented as follows: $(A+B)^2 = A^2 + B^2$, and $sqrt(A+B) = sqrt(A) + sqrt(B)$.

Qsolve is a variation on square-roots. Qsolve(C) operates on field elements C, and gives a solution to the quadratic equation $Z^2 + Z = C$. Only 50% of the field elements have solutions. Those that do, have two solutions, Z and Z+1. Qsolve is also linear. Although Qsolve is relatively complicated to compute, it is also relatively fast.

The TRACE of an element C in the field $GF[2^K]$ can be computed from the formula $Trace(C) = C + C^2 + C^4 + C^8 + C^{16} + \ldots + C^{(2^{(K-1)})}$.

The trace is always 0 or 1. If-and-only-if the trace is 0, the equation $Z^2 + Z = C$ has a solution (in the field). Trace is linear: $Trace(C+D) = Trace(C) + Trace(D)$. This means, for example, that the trace of a general field element can be computed by adding up the traces of the individual bits of the field element.

The foregoing concept is used to compute the Trace-Mask for a field. The Trace-Mask T has the same number of bits as a field element. A bit is 1 in the trace-mask when the corresponding single-bit field element has trace 1. The trace of a field element C can be computed very quickly with the trace-mask: Trace(C) is simply the parity of the bitwise And of C with T. In the programs in the appendix, for $GF[2^{155}]$, the trace-mask has only two 1 bits, so the trace of a field element can be computed simply by examining two of its bit positions.

For odd degree fields (when K is odd), the Half-Trace is useful. $Half\text{-}Trace(C) = C + C^4 + C^{16} + C^{64} + C^{256} + \ldots + C^{(2^{(K-1)})}$. In the quadratic equation $Z^2 + Z = C$, we may take $Z = Half\text{-}Trace(C)$. The Half-Trace function is also linear.

The most preferable elliptic curves use a field $GF[2^K]$ with characteristic 2, and curve equation $Y^2 + X Y = X^3 + A X^2 + B$, where X, Y, A, B are finite field elements. A and B are constants that define the particular curve; X and Y are variables. It is best if $Trace(A) = 1$. If the field degree K is odd, then A may be taken as 1. B is nonzero.

A pair (X,Y) that satisfies the equation is called a "point" of the curve, by analogy with the real-variable case. One additional point, called the "point-at-infinity", is represented by the pair (0,0). The point serves as an identity element for the curve point-addition operation discussed hereinbelow. Most curve operations must check for and handle this point as a special case. The appropriate method of handling the special case of an identity element is well known to those skilled in the art.

The number of curve points is roughly the same as the size of the finite field. The exact number depends on A and B. If Trace(A)=1, the number of points is twice an odd number; otherwise the number of points is a multiple of 4. The Odd Subgroup is largest when Trace(A)=1. B is chosen such that the group order is twice a prime, or has a large prime factor. The procedure preferably attempts low-hamming-weight B values. According to the procedure, for each B, the group size is computed with Schoof's method, and factored. Under the procedure, Bs are attempted until a suitable value is found. A few hundred trials are typically needed.

As appreciated by those of skill in the art, the points of an elliptic curve form a commutative group under an operation fancifully called "Addition". Such Addition is not related to adding ordinary numbers, vectors, or finite field elements. The operation is called "Addition," because, similar to ordinary addition, the operation exhibits commutative and associative properties, has an identity element (the "point at infinity"), and inverses.

The formulas for curve-point Addition, Doubling and Negation are known to those of skill in the art. Point Negation operations are computationally relatively inexpensive. A point P and its negative −P have the same X-coordinate, but have different Y-coordinates.

Beginning with a particular curve point P=(X,Y), integer multiples of the point such as 3*P by repeated Addition: 3*P=(P+P)+P, can be formed. A special Doubling operator is preferably used, when a point is Added to itself. Thus, one may identically compute 4*P in any of a number of ways including without limitation as 2*(2*P) (using the Doubling operator twice) or as (P+(2*P))+P. Addition requires computing the reciprocal of a field element and a couple of field multiplications. Doubling is typically comparatively faster than Addition.

Halving a point is the opposite of Doubling. Halving a point P finds a point Q such that 2*Q=P.

An elliptic curve group is either cyclic (isomorphic to a group of integers mod some modulus J) or the group product of two cyclic groups. For the curves described above, over fields GF[$2^K$] with the quadratic-cubic equation, the group always has an even number of points. The ORDER of a POINT P is the smallest positive integer N for which N*P=the point-at-infinity. The ORDER of a GROUP is the number of points (or elements) in the group. The order of a point always divides exactly into the order of the whole group.

The points of odd order form a subgroup, called the ODD Subgroup, which is either cyclic or the group product of two cyclic groups. The points whose order is a power of 2 form another subgroup, the EVEN subgroup, which is always cyclic and contains a power-of-2 number of elements, and is isomorphic to the group of integers modulo some power of 2. The two subgroups have one point in common, the point at infinity. Many curve points exist that are not in either subgroup. Any point of the curve can be written uniquely as the sum of an Odd Subgroup point and an Even Subgroup point.

The majority of elliptic curve cryptography implementations today use the Odd Subgroup, or a further restricted subgroup thereof. If any curve point is doubled enough times, the result point is in the Odd Subgroup. The Odd Subgroup is mapped 1-1 to itself by doubling. In the group as a whole, doubling is a 2-1 operator; pairs of points are mapped together. Halving, which is the opposite of doubling, is a 1-2 operator. Only 50% of curve points can be halved, and of those that can be halved two answers exist. A point in the Odd Subgroup can always be halved. One of the two resulting answers is also in the Odd Subgroup, and the other is not.

The most efficient methods use XR representation for curve points. The point (X,Y) is instead represented as (X,R); where R=Y/X is the ratio of Y to X. Two special case points exist, where X=0. The two special case points are the point-at-infinity, usually represented in the computer as (X,Y)=(0,0), and the curve mid-point, which has (X,Y)=(0, sqrt(B)). The XR representation for these points may be taken as just (X,Y).

In general, point halving performs at least as well as point doubling. The simplest practical method of computing a multiple of a point is known as Double-and-Add. A more refined variation is called Signed-Sliding-Window, which reduces the number of additions substantially but needs about the same number of doublings as Double-and-Add. The foregoing operations are well known to those of skill in the art. Each of these operations scans the binary representation of the multiplier from high-order to low-order bits, and intersperses doubling steps with occasional addition or subtraction steps. The formula for the multiplier is: k<=L; M=sum Bk $2^k$; k=0; where L=log 2(M), and Bk is the kth bit of the binary representation of M.

To use Halving instead of Doubling, the binary representation is scanned from low-order to high-order. The point P to be multiplied is presumed to be in the Odd Subgroup. The Halve-and-Add method begins with an initial value V=(0, 0)=the-point-at-infinity, and starts with Step 0. The method runs through Step L, where L is defined above. At Step k, if Bk=1, the point P is added to V. Regardless of whether Bk=1, the step is completed by Halving V. After the Lth Step, the answer is V. Since V starts in the Odd Subgroup, and all intermediate steps leave it in the Odd Subgroup, the final answer V is also in the Odd Subgroup.

The computed multiple is $(M/2^L)$*P. If one is able to select the multiplier, a suitable multiplier may be selected. However, an arbitrary multiplier may also be used if it is in conjunction with a preparatory setup adjustment. If the order of the Odd Subgroup is J, then set L=ceiling(log 2(J)). Then M'=M*$2^L$ (mod J) is computed. The binary representation of M' is used (in place of M) in the Halve-and-Add algorithm. The Halve-and-Add algorithm computes $(M'/2^L)$*P, which, since P is in the Odd Subgroup, turns out to be exactly the same as M*P. The refinements of Double-and-Add to produce Signed-Sliding-Window also work for Halve-and-Add, and produce the same improvements.

The order of the Odd Subgroup, designated as J, needs to be known. This is not usually a problem, since the order H of an elliptic curve group is routinely computed before it is used to guard against the chance that the order has no large prime factor. If the order H is computed, it can be checked by generating random points P and verifying H*P=point-at-infinity. It is relatively easy to compute J from H by simply shifting away the low order 0s of J. If J or H are not known, but P is known, $2^L$*P can be pre-computed. M*P may be computed by starting with $2^L$*P and using Halving to compute $(M/2^L)$*$(2^L$*P), which is M*P. If P is a generic point (not in the Odd Subgroup, or not known to be), it may be split into an Odd Subgroup point plus an Even Subgroup point, and these two pieces may be handled separately.

Special handling, which is discussed hereinbelow, is required for generic points not in the Odd Subgroup. If M was substantially smaller than J, then the new L used for Halving and Adding will have more steps than the old L used with Doubling and Adding. It is customary to use M of about the same size as J. Even if M is substantially smaller than J, the Halving and Adding method is sufficiently faster per step than Doubling and Adding, that Halving and Adding typically performs faster, even if more steps are needed. One exception occurs when M is less than sqrt(J), which is not the usual practice.

A discussion of the Point Halving Formula for Odd Subgroup Points When Trace(A)=1 follows. The curve equation is $Y^2+X\,Y=X^3+A\,X^2+B$, where Trace(A)=1. The field trace-mask is T. The point to be halved is (X,R), where R=Y/X. If X=0, then the special case is preferably handled as described hereinafter. First, compute M=Qsolve (X+A); then compute Tmp=X*(R+M); if Parity(Tmp & T)=0, then add 1 to M and add X to Tmp; then compute Xh=Sqrt(Tmp), Rh=M+Xh+1.

(Xh,Rh) is the halved point, and it is in the Odd Subgroup. A special case exists, when X=0. Depending on the application, the designer may know that this cannot occur, and omit the checking code. If R=0, the point-at-infinity is being halved, and simply returns the answer (Xh,Rh)=(0,0). If R is not 0, the routine has been mistakenly called with the curve mid-point, which is not in the Odd Subgroup and causes return of an error value, or causes some other error handling action.

With minor adjustments, this formula also works for halving generic curve points. The needed changes are: (1) The Qsolve, which computes M can fail in which case, the point is not capable of being halved; (2) The "If Parity" line should be regarded instead as a Fork; (3) One branch is the "=0" branch, and the other is the "!=0" branch; (4) Each branch gives one of the two half-points and no particular promise is made that either half-point is in the Odd Subgroup.

The Halving formula for generic points also works for curves with Trace(A)=0. However, the situation with halving points in the Odd Subgroup is comparatively complicated. Although it is preferable to stay within the Odd Subgroup, checking whether a point is in the Odd Subgroup is more difficult. It is important to look ahead to determine which of the two half-points is the Odd Subgroup point. If the size of the Even Subgroup is $2^K$, the procedure looks ahead K halving steps to detect halving failure. If the wrong half-point is picked after halving an Odd Subgroup point, all of the branches of the subsequent "halving tree" fail at the Kth subsequent halving step, and which path is selected through the lookahead tree is irrelevant.

The Trace test "If Parity(Tmp & T)=0" does a computationally inexpensive one-step lookahead, guaranteeing that the (Xh,Rh) point will be halvable. When Trace(A)=1, then the Even Subgroup is of size 2, so K=1, and one step of lookahead is sufficient. If Trace(A)=0, then K>=2. When K=2, the order of the elliptic curve group is four (4) times an odd number. This is a common case, occurring about half the time when A=0 in the elliptic curve equation.

In this case, only two steps of halving lookahead are needed to stay in the Odd Subgroup. The second step can be provided by the Parity test, but the required fixup to M and Tmp must be done to the values in the previous round of Halving. It is possible to salvage some of the intermediate computations, so the cost of the misstep is limited to roughly one wasted Qsolve plus one wasted multiplication. Since missteps only occur about half the time, this is not overly costly.

At the end of the Halving computation for point multiplication, it is still necessary to do the K-step halving lookahead to make sure that the final point is in the Odd Subgroup. The algorithm can be adjusted to omit the final few halving steps, but the last halving actually done must be checked with lookahead.

One may ask why not just ignore the lookahead steps and simply perform halving? The disadvantage of such an approach is the cost of adding the extra point; which is needed at least one-half of the time, thus raising the average cost of halving. This will be computationally less expensive than the K-step lookahead computational cost when K is large, but it makes Halving computationally less competitive with Doubling. It is possible to combine the generator with the base point P ahead of time, and thus save some time when both P and a generator must be added.

If this approach is used, the final point must be forced into the Odd Subgroup to obtain a canonical result. This can be done either by splitting the point into the sum of an Odd Subgroup point (the final answer) plus an Even Subgroup point (discarded), or equivalently, doing K additional halving steps and then "Doubling back" K steps.

The Halving method has been implemented in a computer program. On a 233 MHz DEC Alpha, the new method of point-halving takes 8.45 microseconds to halve a point, compared with point-doubling times of 27-35 microseconds for various doubling methods. Halving is as useful as doubling. Although the raw speedup of halving is a factor of 3.5-4, this advantage will be diluted somewhat by necessary point-addition operations. Since Doubling is the principal operation, the Halving advantage will translate into at least a factor of two (2) in overall point multiplication speed, thus making elliptic curves more competitive as a public key option.

It is necessary to switch to XY form when a point addition is required. The Transition from XR to XY is trivial, requiring only one multiplication. The transition directly from XY to XR requires a reciprocal, which makes the following alternative halving algorithm useful. Halving in XY representation with two multiplies: If X=0, handle special case as described for XR algorithm; compute M=Qsolve(X+A); compute Tmp=Y+X*M; if Parity(Tmp & T)=0, add 1 to M and add X to Tmp; compute Xh=Sqrt (Tmp), Rh=M+Xh+1, Yh=Xh*Rh; Xh, Yh is the halved point.

Although the foregoing formula requires more computation than XR form, it uses the more standard XY format for the curve points. This can also be used to transition from XY format (as might result after a point addition) to XR format for the half-point, skipping the computation of Yh. The need to switch representations in the context of a point-doubling algorithm is well known to those of skill in the art. Those same considerations apply to point-halving.

The principle of "ambiguity-resolution by subgroup membership" is used to choose which of two half-points is in the Odd Subgroup. This principle has other uses as well. In computing a large integer multiple K of a curve point P, K may be represented in balanced-ternary, radix 3 with digits −1, 0, 1. Sliding Window methods can be used to reduce the number of non-zero digits. Under point triplication in Projective Coordinates, the X-coordinate of a triplicate point can be computed fairly computationally inexpensively. If the X coordinate of P is (N,D) in projective coordinates, i.e., X=N/D, the X coordinate of the tripled point 3P is $N*(N^8+B\ N^2\ D^6+B^2\ D^8)/D*(N^8+N^6\ D^2+B^2\ D^8)$. B is from the curve equation, and the formula does not depend on the A term of the curve equation.

The foregoing may be computed in five multiplications, a considerable improvement over the usual cost of point triplication, because the Y coordinate need not be computed. Squaring is computationally inexpensive, as is multiplication by the low-hamming-weight constant B. One may compute the terms $N^2\ D^6$ and $N^6\ D^2$ as $N^2\ D^2$ times $D^4$ and times $N^4$. If several triplications are performed in this way, thus reaching 81P, a point addition must be performed, and the Y coordinate must be recovered.

Some Y coordinates can be recovered by computing $X=N/D$ and solving the curve equation (a quadratic) for Y. Solve $R^2+R=X+A+B/X^2$ for R, then $Y=X\ R$. Compute X and $1/X$ with only one inversion by first computing $1/(N*D)$. According to the foregoing, it is not known if the found Y corresponds to 81 P or −81P. This ambiguity is resolved by adding P, and obtaining either −80P or 82P. These alternatives can be distinguished if the group order is a multiple of 4, and the order of P is divisible by 4. In the simplest case, where the group order in an odd multiple of 4, one of the two prospective points can be quartered, but the other cannot. While the foregoing may appear to be inefficient, most of the arithmetic for the point additions can be shared, and odd multiples of P can be added instead of P. Accordingly, the addition can be performed with the next Sliding-Window digit. Since a real X-coordinate is recovered, $D=1$ may be used at the start of the next triplication cycle, saving a few multiplications.

Ambiguity resolution has at least one other use. Projective point doubling is comparatively computationally inexpensive, when using only the X coordinate. If the X-coordinate of the point P is X, then $Xd=X^2+B/X^2$. Projectively, with X represented as (N,D), the double is $(N^4+B\ D^4, N^2\ D^2)$, which requires only a single multiplication, either $N*D$ or $N^2*D^2$. A quadruplication requires only two multiplications and so forth.

If a low-hamming-weight multiple of P is to be computed with a long series of point doublings between the additions. These doublings are comparatively computationally inexpensive. If the projective X-coordinate of 1024 P with ten doublings has been computed, then Y needs to be determined. Y may be calculated, as discussed hereinabove, by solving the curve equation, which gives the Y-coordinate of either 1024P or −1024P. P is then added, obtaining either 1025P or −1023P, which can be distinguished because one is a triple of another point and the other is not a triple.

It is important that the curve order be a multiple of 3 (empirically, lots of curves meet this), and that the point P not be a triple of another point, which is possible by starting with a suitable initial point P0 (doubling preserves the property). It is possible to test whether a point Q is triple by attempting to solve the equation $3\ Z=Q$ for the point Z, which involves ninth degree polynomials with mostly 0 coefficients that can be solved by the matrix method that Rosing explains for cubics. If Z is found, the result is −1023P, otherwise the result is 1025P.

Qsolve may be used in Solving the Quadratic Equation $Z^2+Z=C$ in a $GF[2^K]$ field. Some shortcuts that may be used in solving the foregoing equation are discussed hereinbelow. The first shortcut is the Half-Trace explained hereinabove, which works in odd-degree fields. The function $f(Z)=Z^2+Z$ is LINEAR in $GF[2^K]$ fields. The inverse function Qsolve is also linear. This means that C can be split into its constituent bits or bytes, table lookup can be used to solve the individual bits and bytes, and the solutions can be added together to obtain Z.

According to the foregoing, half of the Cs have no solution, and the other half have two solutions, Z and Z+1. C is solvable if-and-only-if $Trace(C)=0$. If U is the field generator, some powers of U will have trace 1 and usually some will have trace 0. Suppose $U^t$ is the smallest power of U with trace 1. In an odd degree field, $GF[2^{odd}]$, this will be $t=0$, since $Trace(1)=1$ in this case. In any case, exactly one of C and $C+U^t$ is solvable.

The solution table for the bits or bytes of C may be prepared by entering the solution for either C or $C+U^t$, whichever is solvable. The trace of the bit-or-byte in an extra bit position of the solutions may be entered in the solution table. The low-order bit of each entry is available, since the $UÂ0=1$ term of a solution is useless—the two solutions of the quadratic differ by 1. At the end of combining the solutions of the pieces of C, the low order bit will have the trace of C; if it is a 0, then C is solvable. Otherwise, the solution for $C+U^t$ is provided, which is useful under some circumstances. The foregoing discussion applies to either polynomial basis or normal basis representations. If a projective representation is being used, the preferred method is to convert the number C to a polynomial basis.

An important shortcut is available in normal basis that increases speed and eliminates the need for a solution table. Such an advantage may be compelling if the cost of multiplication and inversion do not exceed the costs in polynomial basis by a significant amount. Let Qsolve(C) represent the solution Z of the equation $Z^2+Z=C$. For definiteness, suppose that the low-order bit of Z is 0, and that C is solvable.

A relationship exists between Qsolve(C) and $Qsolve(C^2)$ as follows: $Qsolve(C^2)=C+Qsolve(C)=Qsolve(C)^2$, ignoring the low-order bit. In a normal basis, the successive bits represent powers $U^{(2^N)}$, and Qsolve(C) can be computed by riffling an xor down the bits of C, from $U^{(2^{(degree-1)})}$ down through $U^1$. The trace of C is the parity of the representation of C, so if the riffle finishes with a 0, C is solvable.

In a polynomial basis, the Qsolve relationship can be used. Even powers of the generator, $U^{(2k)}$, can be folded to their square roots. If a binomial or trinomial is being used as the field polynomial, half of the odd powers of the generator can also be folded away, leaving only degree/4 of the bits to participate in the table lookup.

If a field-tower representation is being used, the even powers of the outer field generator can be folded. Typically, the odd powers can also be folded by using the outer-field extension polynomial. This will mostly reduce the problem to Qsolve of lower-field elements. If the extension is of degree 2, and the extension equation is $V^2+V=K$, with K in the lower field, a typical upper-field element is $C\ V+D$. This element is solvable if-and-only-if C is solvable in the lower field as follows: $Qsolve(C\ V+D)=E\ V+F$; where $E=Qsolve(C)$, and $F=Qsolve(D+K\ E^2)$. If the Qsolve for F fails, add 1 to E, and add $Qsolve(K+U^t)$ to F. Or, just recompute F from the formula.

A clever programmer will precompute and cache $Qsolve(K+U^t)$. If the lower field is odd-degree, take $K=1$ and $t=0$, and the formula for F simplifies to $F=E+Qsolve(D+E)$. An example with extension degree 3: suppose the field equation is $V^3+V=K$, with K in the lower field, then a typical upper-field element is $C\ V^2+D\ V+E$, and the equation to be solved is $Z^2+Z=C\ V^2+D\ V+E$.

The V^2 term can be folded into the V term with the relationship Qsolve(C V^2)=sqrt(C) V+Qsolve(sqrt(C) V). The sqrt is comparatively computationally inexpensive. The Qsolve(E) can be separately split off, and table-lookup or bit-or-byte splitting for Qsolve of the V term can be used.

In another example, with extension degree 5, Suppose the field equation is V^5+K V=1. A typical upper-field element is C V^4+D V^3+E V^2+F V+G. The V^4 term can be folded into the V^2 term, which can be folded into the V term. But the V^3 term may also be discarded by replacing D V^3 with D V^8+K D V^4. The method is: (1) replace the V^3 term; (2) fold the V^8 term into V^4; (3) fold that into V^2; (4) fold that into V; (5) use table-lookup on the V term; and (6) separately solve G.

These principles also apply to towers with more than two levels. Point-Halving is most effective when the order of the elliptic curve group is twice an odd number, when the point to be multiplied is in the Odd Subgroup, and when the user is free to select the multiplier. Nevertheless, point-halving is still useful when these conditions are not satisfied.

If the user is not free to select the multiplier, but must instead use a multiplier M that is provided, the user can convert the multiplier to an equivalent multiplier M' to use with point-halving, so long as the group order is known (the formula is set forth above). Alternatively, when the base point to be multiplied is known ahead of time, the base point can be pre-doubled enough times to compensate for the later halving.

If the point to be multiplied is not in the Odd Subgroup, the point can be split into the sum of an Odd Subgroup point and an Even Subgroup point, each of which is separately multiplied, and the resulting points are added. The Odd Subgroup point is handled according to the principles set forth hereinabove.

Suppose the order of the Even Subgroup is 2^K. The even-subgroup point is multiplied by the low-order K bits of the multiplier. In typical cases, K is 3 or less, and table lookup can be used. The Even Subgroup point will be one of the 2^K elements in the Even Subgroup, and it will appear in the table. The Even Subgroup is cyclic, so the point's table-index is multiplied by the low-order K bits of the multiplier, and the result trimmed to K low-order bits and used to look up the answer. Note that the table need only contain half of the points, since the others will have the same X-coordinate. Also, a significant chance exists that the X-coordinate is 0, and the subgroup point is either (0,0), the point-at-infinity, or (0,sqrtB) (the curve midpoint). These can be handled efficiently even without a table, especially in the case when K=1.

One defining property of an Odd Subgroup point is that it can be halved indefinitely. Any other point can be halved at most K−1 times. For this test, either half-point may be selected at each halving step. For example, if the point can be halved K times, it is in the Odd Subgroup. Typically, the trace function can be used to determine if the current halving step will succeed. When K=1, no halvings actually need to be done, because the trace function does all the work.

If the Hth halving fails, a fixup is required. Suppose Q is a point that generates the Even Subgroup, then the generator Q may be subtracted from the point that cannot be halved, which will make it capable of being halved. Then the halving operation is continued, subtracting Q again, whenever needed at any subsequent halving failure, until K halvings have been completed. The last halving can simply be predicted by using the trace.

At this point the Odd Subgroup and Even Subgroup points need to be computed. The pattern formed by the incapability of being halved for each of the halvings is recorded and regarded as a bit pattern in reverse. A point capable of being halved is a 0 bit, a point that is not capable of being halved is a 1 bit. K bits exist that correspond to the K halvings. The final halving determines the high-order bit, and the first halving determines the low-order bit of a K-bit number N. The Even Subgroup element is simply N*Q, which may be determined by table lookup or computed directly. The Odd Subgroup point is computed by subtracting the point N*Q from the original generic point.

If a multiplier is chosen, but applying the multiplier to a generic point splits the generic point into the sum of an Odd Subgroup point and an Even Subgroup point, then the Even Subgroup point may usually be discarded, and the Odd Subgroup point used in place of the generic point. To calculate the integer-equivalent-multiplier, M/2^L (mod J) can be used for Odd Subgroup points. (J is the order of the Odd Subgroup.) If an equivalent multiplier for general points is needed, then 2^K*(M/2^(L+K) (mod J)) may be used. The order of the Even Subgroup is 2^K.

Multipliers may be expressed in non-standard radices and as algorithms. Expression in non-standard radices and as algorithms may be applied to elements of any group, not just elliptic curves. The multiplier is typically expressed in binary, but other options exist. If subtraction of points or group elements is hard, but there is a method to negatively double a point, going from P to −2P, then it is natural to convert the multiplier to radix −2 (negabinary). When using point triplication, then the multiplier will be converted to ternary. Balanced ternary may be used, with digits −1, 0, and 1. Special curves with complex multiplication may use Gaussian complex integers as multipliers. Typically the unusual numbers have equivalent integer multipliers within the group.

For point-halving, the radix is ½. For point-thirding, the radix is ⅓. Some special curves have easy point-thirding algorithms. It would be equally easy to use the negative of point halving, with radix −½. It is also possible devise a scheme for multiplying a point by ⅔, or −⅔, and use corresponding radices. A scheme that had good algorithms for both point doubling and tripling may use a mixed radix scheme, using both 2s and 3s.

If a user is picking the multiplier, a random digit string can be used in the preferred radix. The typical requirement is that the string be selected from a large enough space. Roughly 2^160 possibilities is current practice, although somewhat smaller numbers such as 2^112 may be acceptable for low security applications. It is preferable that the selection be reasonably uniform, with no "popular values" that are much more likely to be selected. Popular values that have 10-fold extra likelihood are not a problem, but popularity reaching higher than 10-fold extra likelihood reduces security. As a rule of thumb, the security should be derated by the popularity. A scheme that selects from 2^200 possibilities and had maximum popularity 2^20 still has security 2^180.

It is preferable that different choices of digit strings lead to different multipliers. For radices discussed above, it is sufficient to use the correct set of digits to avoid accidental overlapping multipliers (a multiplier is typically popular, if it has lots of different representations). In general, digits can go from 0 up to limit−1, or from −(limit−1)/2 to limit/2 in balanced schemes. Limit is the radix, when it is a positive integer, or its absolute value when it is a negative integer (radix −2 has limit 2), or the larger of |numerator| and |denominator|, when the radix is a fraction. When the radix is complex, first take the norm. If these rules are followed, the maximum overlap is about limit, and often it is 1 or 0.

An interesting danger and opportunity exists. One may be tempted to use random addition-subtraction chains as an equivalent multiplier. The temptation arises because the entropy of the random choice of which elements of the chain to add or subtract contributes to the overall multiplier entropy, allowing many fewer add/sub/double steps to achieve a selection space of 2^160 choices. This practice is risky for ordinary addition/subtraction chains, since many different chains lead to identical multipliers, giving a severe popular-values problem. However, when doubling, halving, or tau-ing are cheap, the addition chain scheme can be corrected by using many doubling steps and the like between additions. Where tau-ing is a bit-rotation, applying a random k-bit rotation to the left (multiplier tau^k) or to the right (multiplier 1/tau^k) between addition/subtraction operations is a high entropy manipulation, and will give good security for minimal computation. If rotation cost depends on k, or if left and right rotations have different costs, it is typically preferable to limit the positive and negative range of k.

One reasonably secure method is easy to use. If the group size is much larger than the security requirement, then it is safe to choose low-hamming-weight multipliers, thus substantially reducing the number of addition-like steps. For example, suppose the security requirement is 2^160, but the group has order around 2^256, with a prime divisor around 2^255. Then a random number of 255 bits with hamming-weight 40 could safely be selected as the multiplier, since the number of choices, binomial (255,40) exceeds 2^160. This would require about 255 doublings, but only 40 additions in a simple double-and-add scheme.

If both addition and subtraction are being used, and have a few more digits available such as 3, 5, 7, a smaller group can be used while achieving the same level of security. This method is applicable to both halving and doubling, and the idea extends to other radices. As the computational cost of doubling/halving/tauing drops relative to the cost of addition/subtraction, it is important to rebalance the choice of multipliers by moving towards the computationally less expensive operations.

Shamir's trick is useful in computing a linear combination of two multipliers (M,N) dotted with two curve points (P,Q), such as M*P+N*Q. This arises, for example, in checking a digital signature. The procedure is to precompute P+Q, and then run a single double-and-add bit-scan over both M and N; if a bit of M is 1, add P to the running value; if a bit of Q is 1, add Q; if both bits are 1, add P+Q. The number of doubling steps drops from log 2(M)+log 2(N) to max(log 2(M),log 2(N)).

Generally, Halving can be used to replace Doubling, by either adjusting the points P and Q, or adjusting the multipliers M and N, or some of each. The strategies are the same as the single point case. Extensions to more than two curve points are also possible.

In the halving scheme, it is natural to use the Signed-Sliding-Window method. This uses a table of odd multiples of the base point, such as 1, 3, 5, and 7, and adds or subtracts a multiple after doing several halving steps. It is equally possible to use fractional digits such as 1/16, 3/16, 5/16, and 7/16; which is better will depend on details such as the available hardware and the like.

Many variations of the invention are possible. For example, the user might choose different curve equations, or use another representation besides XR that is computationally interconverted with XR in a computationally economic manner.

Qsolve, viewed as an operator, commutes with many other operators including without limitation: (1) squaring; (2) square-root; (3) the polynomials $Z^4+Z$ & $Z^4+Z^2+Z$ and their inverses, and (4) many others. This allows great flexibility in rearranging the equations for the elliptic curve operations to produce mathematically equivalent results, or results that are economically converted to mathematically equivalent results, while offering no significant advantage over the present methods. A plurality of different, but equivalent, equations for elliptic curves exist. The methods of the present invention can be transformed as well to apply to other curve equations, generally with no particular advantage or disadvantage.

The methods of the present invention are applicable to many other groups, although the detailed formulas will differ. In particular, other algebraic curves, such as hyper-elliptic curves, and algebraic surfaces, seem susceptible to disambiguation by subgroup membership.

The use of alternative methods such as point-halving or point-(1/tau)-ing or even addition chains to do key exchange is blind-interoperable with the standard methods like Double-and-Add, as well as with other alternative methods. For creating elliptic-curve signatures, the explicit integer equivalent value of the multiplier being used must be known. In all cases, this value can be calculated, typically comparatively computationally inexpensively.

The algorithms of the present invention are independent of the particular methods used for the field arithmetic. The algorithms will work with any method of doing multiplication or division, or squaring or square-rooting, or solving the special quadratic equation.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A computer implemented method embodied in data structures stored in a computer-readable medium to execute the following steps:
   selecting an elliptic curve method;
   executing a point modification algorithm to manipulate points of the elliptic curve method,
      wherein the point modification algorithm includes at least five occurrences of point fractioning, with inputs to said at least five occurrences after a first depending directly or indirectly on results from a previous occurrence;
   generating a signal having a distinct characteristic using the selected elliptic curve method;
   providing substantive content; and
   manipulating the substantive content using the distinct characteristic.

2. The method of claim 1, wherein the point modification algorithm is selected from point addition, point subtraction, point fractioning, point multiplying, rotating, negative point modification, and a combination of one or more thereof.

3. The method of claim 1, wherein manipulating the substantive content comprises encrypting the substantive content.

4. The method of claim 1, wherein manipulating the substantive content comprises decrypting the substantive content.

5. The method of claim 1, wherein the distinct characteristic is selected from a key and a signature.

6. The method of claim 2, wherein point fractioning is selected from integral point fractioning, corresponding to a denominator that is an integral number.

7. The method of claim 2, wherein point multiplying is selected from integral multiplication, imaginary multiplication, and complex multiplication.

8. The method of claim 1, further comprising dynamically specifying the point modification algorithm in lieu of specifying the modification operation in advance.

9. The method of claim 2, further comprising selecting a first point for execution of the point modification algorithm, based on a selected property.

10. The method of claim 9, wherein the selected property is a membership condition placing the first point in a subgroup.

11. The method of claim 10, further comprising repeating the point modification algorithm with a second point selected by another entity selected from a deterministic process, a random process, and a third party.

12. The method of claim 11, wherein the second point is communicated to the point modification algorithm in a format selected from a message and a certificate.

13. The method of claim 2, further comprising selecting a first point and pre-modifying the first point by a modification operation configured to compensate for some of the processing steps, added and corresponding to execution of a series of steps in accordance with the method.

14. The method of claim 1, further comprising sending by a sender and receiving by a receiver the substantive content, and wherein the sender executes a first operation during modification for encryption and the receiver executes a second and distinct operation during modification for decryption.

15. The method of claim 1, wherein generating the distinct characteristic further comprises creating a distinct characteristic selected from a symmetric key configured to be shared by two or more parties, a decryption code for processing an encrypted signal, a digital signature, an asymmetric key, and an authentication.

16. The method of claim 1, further comprising selecting a point and wherein the point is of a type selected from a hyperelliptic curve, an algebraic curve, and abelian variety.

17. The method of claim 1, wherein modifying a point further comprises halving a point represented in a cartesian space and a point existing in a mapped cartesian space having a cartesian representation.

18. The method of claim 17, wherein halving further comprises executing a single field multiplication per halving operation.

19. The method of claim 18, further comprising selecting a point characterized by a cartesian tuple and completing halving using no more than two field multiplications.

20. The method of claim 19, wherein halving further comprises negative halving including computation of a minus one-half multiple.

21. The method of claim 1, further comprising computing a fractional multiple of a point selected from a proper fraction, an improper fraction, and a complex fractional multiple.

22. The method of claim 18, further comprising determining a selection of points to execute a halving operation with respect to, based on testing for membership in a subgroup.

23. The method of claim 22, wherein testing further comprises reliance on a bit mask of coordinates corresponding to points in the subgroup.

24. The method of claim 23, wherein testing is executed by testing whether a halving procedure can be executed an arbitrary number of times selected by a user.

25. The method of claim 24, further comprising determining which of a selected number of points is to be used.

26. An apparatus comprising:
a system for creating a distinct characteristic configured to support cryptographic manipulation of information;
a memory device operably connected to the system for storing the distinct characteristic and executables programmed to operate on the distinct characteristic;
an encrypting device operably connected to the system for controlling an encryption process using the distinct characteristic;
the system further configured to execute an elliptic curve method for generating the distinct characteristic; and
the system further configured to execute a point modification algorithm for generating the distinct characteristic,
wherein the point modification algorithm includes at least five occurrences of point fractioning, with inputs to said at least five occurrences after a first depending directly or indirectly on results from a previous occurrence.

27. The apparatus of claim 26, wherein the point modification algorithm is selected from point addition, point subtraction, point fractioning, point multiplying, rotating, negative point modification, and a combination of one or more thereof.

28. The apparatus of claim 26, wherein the distinct characteristic is configured to be processable by the system for divulging independently to two independent parties a secret to be shared by the two independent parties.

29. An article of manufacture comprising a computer-readable medium storing operational data and executable data structures executable on a processor, the executable data structures comprising:
an encryption engine for operating on distinct characteristics configured to encrypt substantive content representing information;
the encryption engine, further comprising a distinct characteristic generation module for operating on the distinct characteristics;
the distinct characteristic generation module, further comprising an elliptic curve module for providing the distinct characteristics; and
the elliptic curve module, further comprising a point modification algorithm for calculating points related to the distinct characteristic,
wherein the point modification algorithm includes at least five occurrences of point fractioning, with inputs to said at least five occurrences after a first depending directly or indirectly on results from a previous occurrence.

30. The article of claim 29, wherein the point modification algorithm is selected from point addition, point subtraction, point fractioning, point multiplying, rotating, negative point modification, and a combination of one or more thereof.

31. The article of claim 30, wherein point fractioning is selected from integral point fractioning, corresponding to a denominator that is an integral number.

32. The article of claim 30, wherein point multiplying is selected from integral multiplication, imaginary multiplication, and complex multiplication.

33. The article of claim 29, further comprising dynamically specifying the point modification algorithm in lieu of specifying the modification operation in advance.

34. The article of claim 30, further comprising selecting a first point for execution of the point modification algorithm, based on a selected property.

35. The article of claim 29, wherein the distinct characteristics are selected from a key and a signature.

36. The method of claim 1, wherein the elliptic curve is over a finite field;
the finite field is represented by a field polynomial; and
the field polynomial is of low hamming weight.

37. The method of claim 36, wherein the field polynomial is selected from a binomial, a trinomial, and a pentanomial.

38. A computer implemented method embodied in data structures stored in a computer-readable medium to execute the following steps:
selecting an elliptic curve method,
wherein the elliptic curve is over a finite field and the finite field is represented as a field tower;
executing a point modification algorithm to manipulate points of the elliptic curve method,
wherein the point modification algorithm includes at least one occurrence of point fractioning;
generating a signal having a distinct characteristic using the selected elliptic curve method;
providing substantive content; and
manipulating the substantive content using the distinct characteristic.

39. The method of claim 38, wherein the field tower comprises an outer field; and
the extension degree of the outer field is selected from the numbers 2, 3, 5, a product of the numbers, or repeated uses of any of the numbers.

40. The method of claim 38, wherein the field tower has more than two levels.

41. The method of claim 38, wherein the field tower comprises an inner field, having arithmetic, and wherein the arithmetic is accelerated by using pre-computed tables for operations selected from the group consisting of multiplication, squaring, taking the square root, division, reciprocation, taking the logarithm, exponentiation, calculating solutions of quadratic equations, and calculating the solutions of polynomial equations.

42. The method of claim 1, wherein the point modification algorithm comprises solving a quadratic equation using an efficient algorithm.

43. The method of claim 1, wherein the point modification algorithm comprises computing a reciprocal of a field element using an efficient algorithm.

44. The method of claim 1, wherein the point modification algorithm comprises at least one of adding and subtracting of elliptic curve points using an efficient algorithm.

45. The method of claim 44, wherein the addition and subtraction comprises computing a reciprocal of a field element using an efficient algorithm.

46. The method of claim 1, wherein the point modification algorithm comprises point multiplication using a sliding-window method.

47. The method of claim 1, wherein the point modification algorithm comprises at least two occurrences of point fractioning chained together.

48. The method of claim 47, wherein the elliptic curve points comprise intermediate points, having coordinates, and wherein the computation of some of the coordinates is omitted.

49. The method of claim 1, wherein the point modification algorithm further comprises choosing a multiplier having a low hamming weight.

50. The method of claim 1, wherein the point modification algorithm includes point addition and subtraction steps and the point modification algorithm is chosen to minimize the number of steps.

51. The method of claim 1, wherein the point modification algorithm is an addition-subtraction chain, intermixed with point fractioning.

52. The method of claim 1, wherein the elliptic curve is over a finite field, and the size of the finite field is increased such that a smaller number of addition and subtraction steps may be combined with a larger number of point fractioning steps, such that the overall computation effort is reduced, while preserving a specified level of security.

53. The method of claim 42, wherein the efficient algorithm is accelerated by using a Half-Trace formula.

54. The method of claim 42, wherein the efficient algorithm is accelerated by using the relationship between Qsolve(C) and Qsolve(C^2).

55. The method of claim 42, wherein the required storage of the efficient algorithm is reduced by using the relationship between Qsolve(C) and Qsolve(C^2).

56. The method of claim 1, wherein the point modification algorithm further comprises:
using a plurality of representations of the points;
using input points in one or more representations to produce output points in a different representation;
selecting representations that are optimal for succeeding point modification algorithms; and
wherein at least three changes of representation occur.

57. The method of claim 1, wherein at least some of the points are represented in XR representation.

58. The method of claim 56, further comprising switching between the XR and XY representations.

59. A computer implemented method embodied in data structures stored in a computer-readable medium to execute the following steps:
selecting an elliptic curve method;
executing a point modification algorithm to manipulate points of the elliptic curve method, the point modification algorithm comprising one or more ambiguous point triplication steps, where the ambiguity is resolved by determining whether a point is twice halvable;
generating a signal having a distinct characteristic using the elliptic curve method;
providing substantive content; and
manipulating the substantive content using the distinct characteristic.

* * * * *